(No Model.)
H. ROESKE.
FILTER.
No. 314,150. Patented Mar. 17, 1885.
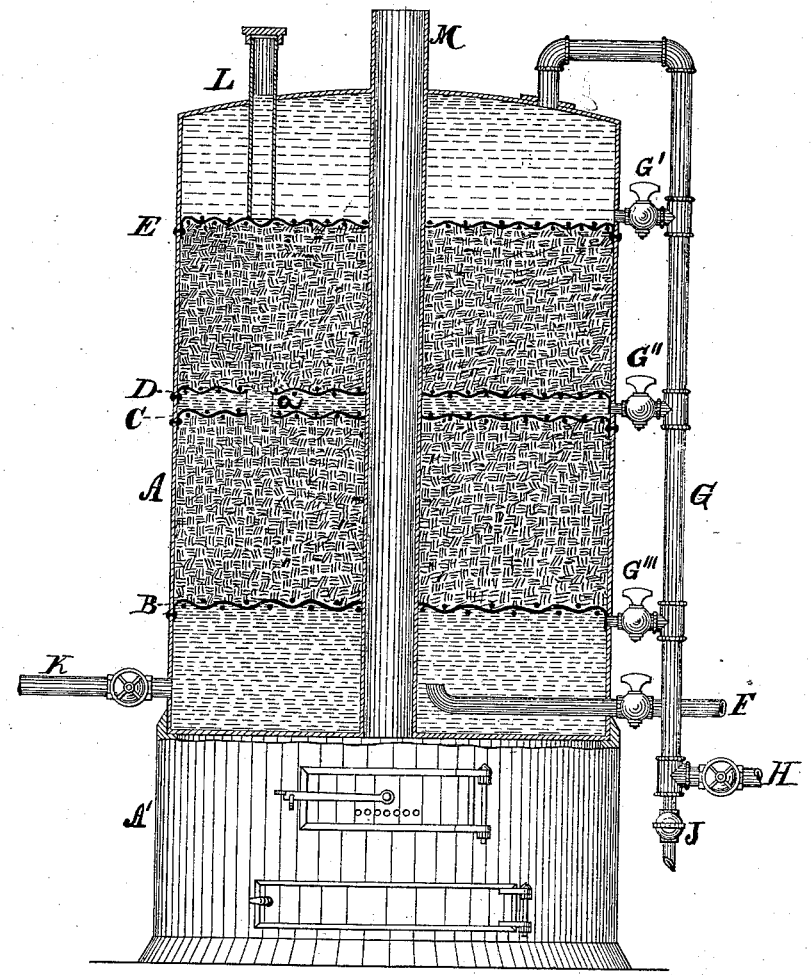
WITNESSES:
A. P. Grant
W. F. Kircher
INVENTOR:
Henry Roeske
BY John A. Wiedersheim
ATTORNEY.

United States Patent Office.

HENRY ROESKE, OF PHILADELPHIA, PENNSYLVANIA, ASSIGNOR OF ONE-HALF TO MANOEL J. NASCIMENTO, OF SAME PLACE.

FILTER.

SPECIFICATION forming part of Letters Patent No. 314,150, dated March 17, 1885.

Application filed September 30, 1884. (No model.)

*To all whom it may concern:*

Be it known that I, HENRY ROESKE, a citizen of the United States, residing in the city and county of Philadelphia, State of Pennsylvania, have invented a new and useful Improvement in Filters, which improvement is fully set forth in the following specification and accompanying drawing, in which the figure represents a vertical section of a filter embodying my invention and a side elevation of a furnace employed therewith.

My invention consists of a filter which is reliable in operation, and may be readily cleansed, is adapted to permit the removal of water or fluid at different stages of filtration or purification, may be replenished with filtering material, and provision is made for heating the fluid, as will be hereinafter fully set forth.

Referring to the drawings, A represents a tank constructed of metal or other suitable material, and A' represents a furnace supporting the same.

B C D E represent partitions of perforated metal gauze, wire-work, &c., arranged horizontally, or one above the other, and secured to the tank A, it being noticed that a space exists between the partitions C D.

F represents a pipe for the inlet of fluid to be filtered, the same entering the chamber below the partition B.

Connected with the tank, at the top thereof, and communicating with the chamber above the partition E, is the discharge-pipe G, which has branches G' G" G"' provided with cocks, said branches leading to the different chambers, it being noticed that the pipe G extends along the side of the tank and has at its lower end discharge-branches H J.

K represents a pipe connected with the tank, and leading into the bottom chamber thereof, the same being adapted to direct steam into the filter for cleaning purposes.

The space between the partitions B C and D E is filled with filtering material, and in order to supply said chambers or renew said material I employ a pipe, L, which passes through the top of the tank to the filtering-material, it being noticed that openings *a* are made at coincident places in the partitions D C to permit the filtering material to pass from the upper to the lower chambers adapted to receive said material.

Rising from the furnace A' is a flue, M, which passes through the fluid and filtering-chambers and serves to carry off the products of combustion as well as to heat the fluid, the latter feature being of importance when warm or hot filtered water is designed for boiler-feed, laundry purposes, &c.

It will be seen that when water enters the tank through pipe F it ascends and is filtered in its passage through the filtering-chambers, and in its filtered and pure condition discharged through the pipe G and branch H. Should it be desired to remove the water at different stages of filtration or purification, either of the cocks of the branches G' G" G"' is opened, and thus access is had to the water either in the lower, middle, or upper chambers, and the condition of the water at different heights may be readily determined.

When the filter is to be cleansed, steam is admitted thereto by the pipe K, and the steam by its force or pressure rising through the chambers removes impurities and accumulations in the filters, the same being discharged through the pipe G and branch J, it being evident that in these various manipulations the proper cocks are opened and others are closed.

The device is compact, strong, and durable.

Having thus described my invention, what I claim as new, and desire to secure by Letters Patent, is—

1. In a filter, the tank A, having the fixed perforated partitions B, C, D, and E, said partitions C D having openings *a*, and provided with the pipe L, leading from the upper chamber having filtering material to the outside of the tank, substantially as and for the purpose set forth.

2. The furnace A', in combination with the tank A, having a flue, M, and fixed partitions B, C, D, and E, said partitions C D having openings *a*, the pipe L, supply-pipe F, discharge-pipe G, having branches G' G" G"', and steam-inlet pipe K, substantially as and for the purpose set forth.

HENRY ROESKE.

Witnesses:
JOHN A. WIEDERSHEIM,
JNO. K. PLITT.